(12) United States Patent
Nakazawa et al.

(10) Patent No.: US 11,300,131 B2
(45) Date of Patent: Apr. 12, 2022

(54) ELECTRIC MOTOR SYSTEM AND TURBO COMPRESSOR PROVIDED THEREWITH

(71) Applicant: DAIKIN INDUSTRIES, LTD., Osaka (JP)

(72) Inventors: Yuji Nakazawa, Osaka (JP); Atsushi Sakawaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 182 days.

(21) Appl. No.: 16/606,440

(22) PCT Filed: Apr. 27, 2018

(86) PCT No.: PCT/JP2018/017198
§ 371 (c)(1),
(2) Date: Oct. 18, 2019

(87) PCT Pub. No.: WO2018/207669
PCT Pub. Date: Nov. 15, 2018

(65) Prior Publication Data
US 2021/0108646 A1    Apr. 15, 2021

(30) Foreign Application Priority Data

May 9, 2017   (JP) .............................. JP2017-093330

(51) Int. Cl.
*F04D 25/06*    (2006.01)
*H02K 7/09*    (2006.01)
(Continued)

(52) U.S. Cl.
CPC .......... *F04D 25/06* (2013.01); *F04D 29/048* (2013.01); *F04D 29/058* (2013.01);
(Continued)

(58) Field of Classification Search
CPC .. F04D 29/058; F04D 25/0606; F04D 29/051; F04D 17/10; F04D 25/06;
(Continued)

(56) References Cited

U.S. PATENT DOCUMENTS 5,355,040 A  * 10/1994  New .................... F16C 32/0402
                                                         310/90
5,708,346 A  *  1/1998  Schob .................. F16C 32/0493
                                                         318/803

(Continued)

FOREIGN PATENT DOCUMENTS

EP      0 739 078 A2    10/1996
JP      59-69522 A       4/1984
(Continued)

*Primary Examiner* — Dominick L Plakkoottam
(74) *Attorney, Agent, or Firm* — Birch, Stewart, Kolasch & Birch, LLP.

(57) ABSTRACT

A radial load of a drive shaft is supported by only a plurality of bearingless motors. Maximum values of the radial load acting on the plurality of bearingless motors are not uniform. The bearingless motor, the maximum value of the radial load acting on which is the largest, has a greater maximum value of supporting magnetic flux generated to generate an electromagnetic force for supporting the radial load, compared with the bearingless motor, the maximum value of the radial load acting on which is the smallest. This configuration allows a reduction in size of a rotary system including a load and a drive shaft in an electric motor system.

17 Claims, 6 Drawing Sheets

(51) Int. Cl.
*H02K 7/14* (2006.01)
*F04D 29/048* (2006.01)
*F16C 32/04* (2006.01)
*F04D 29/058* (2006.01)
*H02K 16/00* (2006.01)

(52) U.S. Cl.
CPC ............ *F16C 32/0412* (2013.01); *H02K 7/09* (2013.01); *H02K 7/14* (2013.01); *H02K 16/00* (2013.01)

(58) Field of Classification Search
CPC ........ F04D 29/048; H02K 7/09; H02K 7/083; H02K 16/00; H02K 21/14
See application file for complete search history.

(56) References Cited

U.S. PATENT DOCUMENTS

| | | | |
|---|---|---|---|
| 6,324,134 B1 | 11/2001 | Ohtachi et al. | |
| 6,603,787 B1* | 8/2003 | Sekiguchi | F16C 32/047 372/57 |
| 6,770,992 B2* | 8/2004 | Yamauchi | F16C 32/0444 310/90.5 |
| 6,927,517 B2* | 8/2005 | Brunet | F16C 32/0476 310/90.5 |
| 7,456,537 B1* | 11/2008 | Kascak | F16C 32/0446 310/113 |
| 7,666,062 B2* | 2/2010 | Kubo | B24B 41/044 451/5 |
| 8,115,358 B1* | 2/2012 | Rakov | F16C 32/0453 310/90.5 |
| 9,657,744 B2* | 5/2017 | Gilarranz | F04D 25/0686 |
| 2002/0187052 A1 | 12/2002 | Adaniya et al. | |
| 2006/0163962 A1* | 7/2006 | Shimada | B23Q 11/127 310/90.5 |
| 2007/0164627 A1* | 7/2007 | Brunet | F16C 32/0476 310/90.5 |
| 2010/0133939 A1 | 6/2010 | Takemoto et al. | |
| 2010/0231076 A1* | 9/2010 | Chiba | H02K 7/09 310/90.5 |
| 2012/0228965 A1 | 9/2012 | Bang et al. | |
| 2013/0343927 A1* | 12/2013 | Ramdane | F16C 32/0497 417/365 |
| 2014/0023534 A1* | 1/2014 | Ramdane | F16C 32/0495 417/420 |
| 2014/0306459 A1 | 10/2014 | Aso et al. | |
| 2015/0167687 A1* | 6/2015 | Kurihara | F04D 29/059 415/229 |
| 2016/0273324 A1* | 9/2016 | Yamaguchi | F04D 29/0516 |
| 2017/0234364 A1* | 8/2017 | Sakawaki | F16C 32/0451 310/90.5 |
| 2017/0298985 A1* | 10/2017 | Brakensiek | D01H 4/14 |
| 2020/0028409 A1* | 1/2020 | Jastrzebski | H02K 17/165 |
| 2020/0119615 A1* | 4/2020 | Zhu | H02K 7/025 |
| 2021/0108646 A1* | 4/2021 | Nakazawa | F04D 25/06 |

FOREIGN PATENT DOCUMENTS

| | | |
|---|---|---|
| JP | 2524492 Y2 | 1/1997 |
| JP | 2000-76676 A | 3/2000 |
| JP | 2002-253576 A | 9/2002 |
| JP | 2002-364535 A | 12/2002 |
| JP | 2004-120886 A | 4/2004 |
| JP | 2010-180974 A | 8/2010 |
| JP | 2010-252605 A | 11/2010 |
| JP | 2013-505697 A | 2/2013 |
| JP | 2014-5833 A | 1/2014 |
| JP | 2014-241725 A | 12/2014 |
| JP | 2016-114114 A | 6/2016 |
| WO | WO 2013/080998 A1 | 6/2013 |

\* cited by examiner

ELECTRIC MOTOR SYSTEM AND TURBO COMPRESSOR PROVIDED THEREWITH

TECHNICAL FIELD

The present invention relates to an electric motor system and a turbo compressor having the electric motor system.

BACKGROUND ART

An electric motor system having a drive shaft which rotates a load and an electric motor which rotates the drive shaft has been known (see, e.g., Patent Document 1). The electric motor system of this document is provided in a turbo compressor, and includes two radial magnetic bearings which support a radial load of the drive shaft in a non-contact manner by an electromagnetic force, and one thrust magnetic bearing which controls the axial position of the drive shaft in a non-contact manner by an electromagnetic force. The two radial magnetic bearings are respectively arranged on both sides of the electric motor.

On the other hand, in recent years, a bearingless motor defined as a "motor having magnetically integrated functions of magnetic bearings" has been studied and put into practical use (see, e.g., Patent document 2). Such a bearingless motor is applied, for example, to an auxiliary artificial heart.

CITATION LIST

Patent Documents

Patent Document 1: Japanese Unexamined Patent Publication No. 2016-114114

Patent Document 2: Japanese Unexamined Patent Publication No. 2014-241725

SUMMARY OF THE INVENTION

Technical Problem

It is conceivable to use a bearingless motor instead of the electric motor and the two radial magnetic bearings in the above electric motor system. In this case, it is further conceivable to arrange a plurality of bearingless motors next to one another in the axial direction of the drive shaft to enable position control with respect to the tilt direction of the drive shaft.

The maximum values of the radial load acting on the plurality of bearingless motors are not uniform. Specifically, the maximum value of the radial load of the drive shaft increases, for example, as the drive shaft is closer to the load. Thus, if all the plurality of bearingless motors are designed in the same manner, all the bearingless motors should be designed according to the bearingless motor for which the maximum value of the radial load is the largest, and the rest of the bearingless motors for which the maximum values of the radial load are not the largest (in particular the bearingless motor for which the maximum value of the radial load is the smallest) may be unnecessarily increased in size. The increase in size of the bearingless motors leads to an increase in size of the rotary system including the load and the drive shaft in the electric motor system.

In view of the foregoing background, it is an object of the present invention to reduce the size of a rotary system including a load and a drive shaft in an electric motor system.

Solution to the Problem

A first aspect of the present disclosure is directed to an electric motor system (2). The electric motor system (2) includes: a drive shaft (30) which rotates a load (20); and a plurality of bearingless motors (60, 70) arranged next to each other in an axial direction of the drive shaft (30), and each having a set of a rotor (61, 71) and a stator (64, 74) to rotate the drive shaft (30) and support a radial load of the drive shaft (30) in a non-contact manner by an electromagnetic force, wherein the electric motor system is configured such that the radial load of the drive shaft (30) is supported by only the plurality of bearingless motors (60, 70); maximum values of the radial load acting on the plurality of bearingless motors (60, 70) are not uniform; and the bearingless motor (60), the maximum value of the radial load acting on which is the largest, has a greater maximum value of a supporting force for supporting the radial load, compared with the bearingless motor (70), the maximum value of the radial load acting on which is the smallest.

In the first aspect, the radial load of the drive shaft (30) is supported by only the plurality of bearingless motors (60, 70). Moreover, the bearingless motor (60), the maximum value of the radial load acting on which is the largest, has a greater maximum value of a supporting force for supporting the radial load of the drive shaft (30), compared with the bearingless motor (70), the maximum value of the radial load acting on which is the smallest. The bearingless motor (60), the maximum value of the radial load acting on which is the largest, can therefore generate a large supporting force with respect to the radial load. That is, the bearingless motor (60) capable of generating a large supporting force is disposed in a portion of the drive shaft (30) where the maximum value of the radial load is large, thereby achieving an arrangement of the bearingless motors (60, 70) suitable for the radial load distribution of the drive shaft (30). Further, the radial magnetic bearings used in the conventional system so as to support the radial load of the drive shaft (30) are not required in the above configuration. The rotary system including the load (20) and the drive shaft (30) can thus be reduced in size.

A second aspect of the present disclosure is an embodiment of the first aspect of the present disclosure. In the second aspect, the bearingless motor (60), the maximum value of the radial load acting on which is the largest, has a greater maximum value of supporting magnetic flux generated to generate an electromagnetic force for supporting the radial load, compared with the bearingless motor (70), the maximum value of the radial load acting on which is the smallest.

In the second aspect, the bearingless motor (60), the maximum value of the radial load acting on which is the largest, is designed such that the supporting magnetic flux has a great maximum value, thereby increasing the supporting force for supporting the radial load of the drive shaft (30) by the bearingless motor (60).

A third aspect of the present disclosure is an embodiment of the first or second aspect of the present disclosure. In the third aspect, the bearingless motor (60), the maximum value of the radial load acting on which is the largest, has a smaller magnetic resistance of a magnetic path for generating the supporting force for supporting the radial load, compared with the bearingless motor (70), the maximum value of the radial load acting on which is the smallest.

The third aspect utilizes the phenomenon in which a greater supporting force can be generated if the magnetic resistance of the magnetic path for generating the supporting force for supporting the radial load is smaller. That is, the bearingless motor (60) having a smaller magnetic resistance of the magnetic path for generating the supporting force for supporting the radial load can generate a greater supporting force for supporting the radial load, as compared to the bearingless motor (70) having a greater magnetic resistance of the magnetic path. This mean that the bearingless motor (60) capable of generating a large radial load supporting force is disposed in a portion of the drive shaft (30) where the maximum value of the radial load is large, thereby achieving an arrangement of the bearingless motors (60, 70) suitable for the radial load distribution of the drive shaft (30).

A fourth aspect of the present disclosure is an embodiment of the first or second aspect of the present disclosure. In the fourth aspect, electric circuits (91, 92) which are provided so as to respectively correspond to the plurality of bearingless motors (60, 70), and through which a current for generating, in the bearingless motors (60, 70), magnetic flux that contributes to supporting the radial load flows, wherein the electric circuit (91) corresponding to the bearingless motor (60), the maximum value of the radial load acting on which is the largest, has a greater maximum value of the current for generating the magnetic flux that contributes to supporting the radial load, compared with the electric circuit (92) corresponding to the bearingless motor (70), the maximum value of the radial load acting on which is the smallest.

The fourth aspect utilizes the phenomenon in which a greater supporting force can be generated if the current, flowing through the bearingless motor (60, 70), for generating the magnetic flux that contributes to supporting the radial load becomes larger. That is, the bearingless motor (60) corresponding to the electric circuit (91) in which the maximum value of the current for generating the magnetic flux that contributes to supporting the radial load is large, can generate a larger radial load supporting force than the bearingless motor (70) corresponding to the electric circuit (92) in which the maximum value of such current is small. That is, the bearingless motor (60) capable of generating a large radial load supporting force is disposed in a portion of the drive shaft (30) where the maximum value of the radial load is large, thereby achieving an arrangement of the bearingless motors (60, 70) suitable for the radial load distribution of the drive shaft (30).

A fifth aspect of the present disclosure is an embodiment of the first or second aspect of the present disclosure. In the fifth aspect, the stators (64, 74) of the respective bearingless motors (60, 70) include coils (66a to 66c, 67a to 67c, 76a to 76c, 77a to 77c) for generating the magnetic flux that contributes to supporting the radial load, and the bearingless motor (60), the maximum value of the radial load acting on which is the largest, has a greater number of windings of the coils (66a to 66c, 67a to 67c, 76a to 76c, 77a to 77c), compared with the bearingless motor (70), the maximum value of the radial load acting on which is the smallest.

The fifth aspect utilizes the phenomenon in which a greater supporting force can be generated if the number of windings of the coils (66a to 66c, 67a to 67c, 76a to 76c, 77a to 77c) for generating the magnetic flux that contributes to supporting the radial load is larger. That is, the bearingless motor (60) includes the coils (66a to 66c, 67a to 67c, 76a to 76c, 77a to 77c) for generating the magnetic flux that contributes to supporting the radial load, and the number of windings of the coils is large. The bearingless motor (60) can thus generate a greater radial load supporting force than the bearingless motor (70) including the coils (66a to 66c, 67a to 67c, 76a to 76c, 77a to 77c), the number of windings of which coils is small. That is, the bearingless motor (60) capable of generating a large radial load supporting force is disposed in a portion of the drive shaft (30) where the maximum value of the radial load is large, thereby achieving an arrangement of the bearingless motors (60, 70) suitable for the radial load distribution of the drive shaft (30).

A sixth aspect of the present disclosure is an embodiment of any one of the first to fifth aspects of the present disclosure. In the sixth aspect, each of the rotors (61, 71) of the respective bearingless motors (60, 70) includes a plurality of permanent magnets (63, 73), and the bearingless motor (70), the maximum value of the radial load acting on which is the smallest, has a greater number of the permanent magnets (63, 73) included in the rotor (61, 71), compared with the bearingless motor (60), the maximum value of the radial load acting on which is the largest.

The sixth aspect utilizes the phenomenon in which the density of the magnetic flux generated by the permanent magnets (63, 73) is increased if the number of permanent magnets (63, 73) included in the rotor (61, 71) is large and a greater driving torque is thus generated. That is, the bearingless motor (70) having a large number of permanent magnets (73) in the rotor (71) is suitable for rotating the load (20) and the drive shaft (30), and the bearingless motor (60) having a small number of permanent magnets (63) in the rotor (61) is suitable for supporting the radial load of the drive shaft (30).

A seventh aspect of the present disclosure is an embodiment of the sixth aspect of the present disclosure. In the seventh aspect, all of the permanent magnets (73) of the bearingless motor (70), the maximum value of the radial load acting on which is the smallest, and all of the permanent magnets (63) of the bearingless motor (60), the maximum value of the radial load acting on which is the largest, are identical in shape.

In the seventh aspect, all the permanent magnets (63, 73) of the at least two bearingless motors (60, 70) are identical in shape, thereby reducing the cost of the electric motor system (2).

An eighth aspect of the present disclosure is an embodiment of the seventh aspect of the present disclosure. In the eighth aspect, the number of the permanent magnets (73) of the bearingless motor (70), the maximum value of the radial load acting on which is the smallest, is twice the number of the permanent magnets (63) of the bearingless motor (60), the maximum of the radial load acting on which is the largest, and an angular pitch (AP2) between adjacent ones of the permanent magnets (73) of the rotor (71) of the bearingless motor (70) in a circumferential direction, the maximum value of the radial load acting on which bearingless motor (70) is the smallest, is half an angular pitch (AP1) between adjacent ones of the permanent magnets (63) of the rotor (61) of the bearingless motor (60) in the circumferential direction, the maximum of the radial load acting on which bearingless motor (60) is the largest.

In the eighth aspect, in the case where the rotor (61, 71) of the bearingless motor (60, 70) is composed of laminated steel sheets each of which is punched, the same die can be used for fabricating the rotor (61) of the bearingless motor (60), the maximum value of the radial load acting on which is the largest, and for fabricating the rotor (71) of the bearingless motor (70), the maximum value of the radial load acting on which is the smallest. The same die can be used because the through holes having the same shape for accommodating the permanent magnets (63, 73) having the same shape are disposed at the same positions in both of the rotor (61) of the bearingless motor (60), the maximum value of the radial load acting on which is the largest, and the rotor (71) of the bearingless motor (70), the maximum value of the radial load acting on which is the smallest.

In the eighth aspect, if, for example, the number of the permanent magnets (63) of the bearingless motor (60), the maximum value of the radial load acting on which is the largest, is four, the number of the permanent magnets (73) of the bearingless motor (70), the maximum value of the radial load acting on which is the smallest, is eight. The four permanent magnets (63) are arranged at an angular pitch (AP2) of 90° in the circumferential direction of the rotor (61), while the eight permanent magnets (73) are arranged at an angular pitch (AP1) of 450 in the circumferential direction of the rotor (71). The eight permanent magnets (73) arranged at the angular pitch (AP2) of 45° includes two sets of four permanent magnets (63) arranged at the angular pitch of 90°, and the two sets of the permanent magnets are shifted 45° from each other. Thus, in this example, the same die of a single type capable of forming through holes having a predetermined shape and arranged at the angular pitch (AP1) of 90° can be used in both of punching the laminated steel sheets constituting the rotor (61) of the bearingless motor (60), the maximum value of the radial load acting on which is the largest, and punching the laminated steel sheets constituting the rotor (71) of the bearingless motor (70), the maximum value of the radial load acting on which is the smallest.

A ninth aspect of the present disclosure is directed to a turbo compressor (1). The turbo compressor (1) includes: an electric motor system (2) according to any one of the first to eighth aspects of the present disclosure: and an impeller (20), wherein the impeller (20) is the load (20) rotated by the drive shaft (30).

In the ninth aspect, the turbo compressor (1) having advantages according to any one of the first to eighth aspects is provided.

A tenth aspect of the present disclosure is an embodiment of the ninth aspect of the present disclosure. In the tenth aspect, the impeller (20) is arranged at only one end of the drive shaft (30), and among the plurality of bearingless motors (60, 70), the bearingless motor (60), the maximum value of the radial load acting on which is the largest, is nearest to the impeller (20).

In the tenth aspect, among the plurality of bearingless motors (60, 70), the bearingless motor (60) capable of generating a large supporting force for supporting the radial load is nearest to the impeller (20) (that is, at a portion where the radial load of the drive shaft (30) is large). An arrangement of the bearingless motors (60, 70) suitable for the radial load distribution of the drive shaft (30) can thus be achieved.

Advantages of the Invention

According to the first to fifth aspects, the conventional radial magnetic bearings are not necessary, which allows a reduction in size of the rotary system including the load (20) and the drive shaft (30). The electric motor system (2) can thus be reduced in size.

In the sixth aspect, the bearingless motor (60), the maximum value of the radial load acting on which is the largest, can be designed to be suitable for supporting the radial load of the drive shaft (30). At the same time, the bearingless motor (70), the maximum value of the radial load acting on which is the smallest, can be designed to be suitable for rotating the load (20) and the drive shaft (30).

In the seventh aspect, the permanent magnets (63, 73) having the same shape are used for the at least two bearingless motors (60, 70), thereby reducing the cost of the electric motor system (2).

In the eighth aspect, in the case where the rotor (61) of the bearingless motor (60), the maximum value of the radial load acting on which is the largest, and the rotor (71) of the bearingless motor (70), the maximum value of the radial load acting on which is the smallest, are composed of laminated steel sheets, the same die can be used in punching both of the bearingless motors (60, 70).

DESCRIPTION OF EMBODIMENTS

Embodiments of the present invention will be described in detail with reference to the drawings. The embodiments below are merely exemplary ones in nature, and are not intended to limit the scope, applications, or use of the present invention.

<Configuration of Turbo Compressor>

Figure 1:
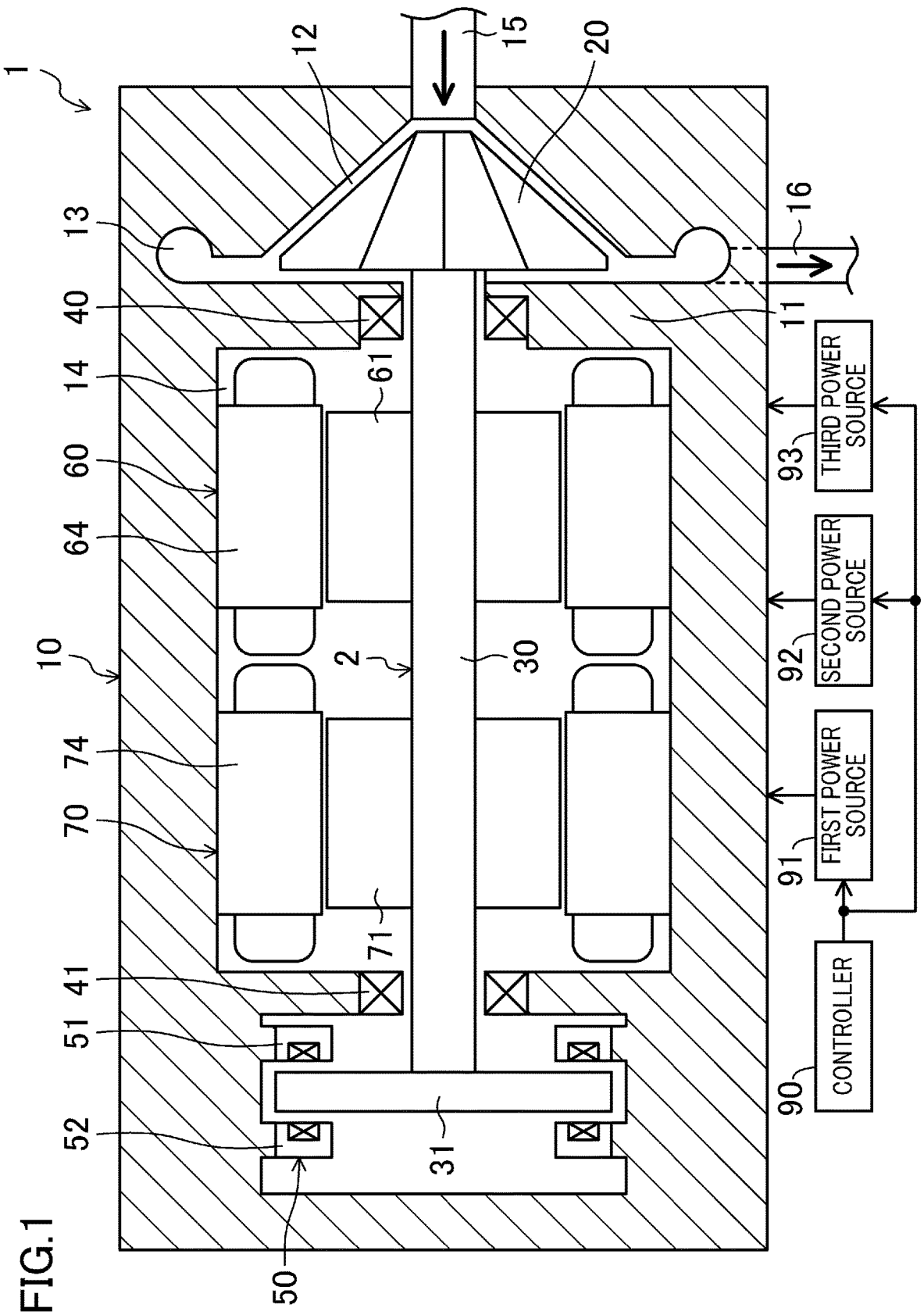
FIG. 1 is a diagram illustrating a front view of an example configuration of a turbo compressor according to an embodiment of the present invention.

A turbo compressor (1) of this embodiment compresses a refrigerant provided in a refrigerant circuit (not shown) configured to perform a refrigeration cycle. As illustrated in FIG. 1, the turbo compressor (1) includes a casing (10), an impeller (20), a drive shaft (30), a touchdown bearing (40, 41), a thrust magnetic bearing (50), a controller (90), a first to third power sources (91 to 93), a first bearingless motor (60), and a second bearingless motor (70). The first bearingless motor (60) and the second bearingless motor (70) are arranged next to each other in the axial direction of the drive shaft (30).

The drive shaft (30) and the first and second bearingless motors (60, 70) constitute an electric motor system (2). The impeller (20) constitutes a load, but the type of the load is not limited to the impeller (20).

In the following description of this specification, the "axial direction" refers to a direction of the axis of rotation, which is the direction of the axis of the drive shaft (30). The "radial direction" refers to a direction perpendicular to the axial direction of the drive shaft (30). The "outer circumferential side" refers to a side farther from the axis of the drive shaft (30). The "inner circumferential side" refers to a side closer to the axis of the drive shaft (30).

—Casing—

The casing (10) is in a cylindrical shape with its both ends closed, and is arranged such that its axial direction extends horizontally. The space in the casing (10) is partitioned by a wall (11). The space on the right of the wall (II) constitutes an impeller chamber (12) for accommodating the impeller (20). The space on the left of the wall (11) constitutes an electric motor chamber (14) for accommodating the first and second bearingless motors (60, 70). The drive shaft (30) extending in the axial direction of the casing (10) connects the impeller (20) and the first and second bearingless motors (60, 70). The first bearing motor (60) constitutes a bearingless motor, the maximum value of the radial load acting on which is the largest (in this example, the bearingless motor nearest to the impeller (20)). The second bearing motor (70) constitutes a bearingless motor, the maximum value of the radial load acting on which is the smallest (in this example, the bearingless motor farthest from the impeller (20)).

—Impeller—

The impeller (20) has a plurality of blades, and thus has substantially a conical outer shape. The impeller (20) is accommodated in the impeller chamber (12) while being fixed to one end of the drive shaft (30). An intake pipe (15) and a discharge pipe (16) are connected to the impeller chamber (12), and a compression space (13) is formed in an outer circumferential portion of the impeller chamber (12). The intake pipe (15) is intended to introduce the refrigerant from the outside into the impeller chamber (12). The discharge pipe (16) is intended to return the high-pressure refrigerant compressed in the impeller chamber (12) to the outside.

—Touchdown Bearing—

The turbo compressor (1) is provided with two touchdown bearings (40, 41). The touchdown bearing (40), which is one of the touchdown bearings, is provided in the vicinity of one end portion (a right end portion in FIG. 1) of the drive shaft (30). The other touchdown bearing (41) is provided in the vicinity of the other end portion of the drive shaft (30). The touchdown bearings (40, 41) are configured to support the drive shaft (30) when the first and second bearingless motors (60, 70) are not energized (i.e., when the drive shaft (30) is not floating).

—Thrust Magnetic Bearing—

As illustrated in FIG. 1, the thrust magnetic bearing (50) includes first and second electromagnets (51, 52) and is configured to support a disc-shaped portion (hereinafter referred to as a disk portion (31)) provided at the other end portion of the drive shaft (30) (i.e., the end portion opposite to the one end portion to which the impeller (20) is fixed) in a non-contact manner by an electromagnetic force. The thrust magnetic bearing (50) can control the position of the supported portion (the disk portion (31)) of the drive shaft (30) in a direction in which the first and second electromagnets (51, 52) face each other (i.e., the axial direction, which is the lateral direction in FIG. 1) by controlling the electric current flowing through the first and second electromagnets (51, 52).

—Controller—

The controller (90) outputs a voltage command value (a thrust voltage command value) for controlling a voltage to be supplied to the thrust magnetic bearing (50), and a voltage command value (a motor voltage command value) for controlling a voltage to be supplied to the first and second bearingless motors (60, 70) so that the drive shaft (30) is positioned at a desired position. The voltage command values are outputted based on a detection value of a gap sensor (not shown) capable of detecting a gap between the disk portion (31) and the thrust magnetic bearing (50), a detection value of a gap sensor (not shown) capable of detecting a gap between the stator (64, 74) and the rotor (61, 71) in the first and second bearingless motors (60, 70), and information on target rotational speeds of the impeller (20) and the drive shaft (30). For example, the controller (90) may be comprised of a microcomputer (not shown) and a program which operates the microcomputer.

—Power Source—

A first power source (91) supplies a voltage to the first bearingless motor (60) based on the motor voltage command value from the controller (90). A second power source (92) supplies a voltage to the second bearingless motor (70) based on the motor voltage command value from the controller (90). A third power source (93) supplies a voltage to the thrust magnetic bearing (50) based on the thrust voltage command value from the controller (90). The first power source (91) has a larger maximum value of a current for generating magnetic flux that contributes to supporting a radial load of the drive shaft (30) (i.e., driving magnetic flux and supporting magnetic flux), as compared with the second power source (92). For example, each of the first to third power sources (91 to 93) may be configured as a pulse width modulation (PWM) amplifier. The first power source (91) constitutes an electric circuit corresponding to the first bearingless motor (60). The second power source (92) constitutes an electric circuit corresponding to the second bearingless motor (70).

—First Bearingless Motor—

The first bearingless motor (60) is disposed in the electric motor chamber (14) toward the impeller (20). The first bearingless motor (60) is configured to rotate the drive shaft (30) and support the radial load of the drive shaft (30) in a non-contact manner by an electromagnetic force. The first bearingless motor (60) has a set of a rotor (61) and a stator (64). The rotor (61) is fixed to the drive shaft (30), and the stator (64) is fixed to the inner circumferential wall of the casing (10).

Figure 2:
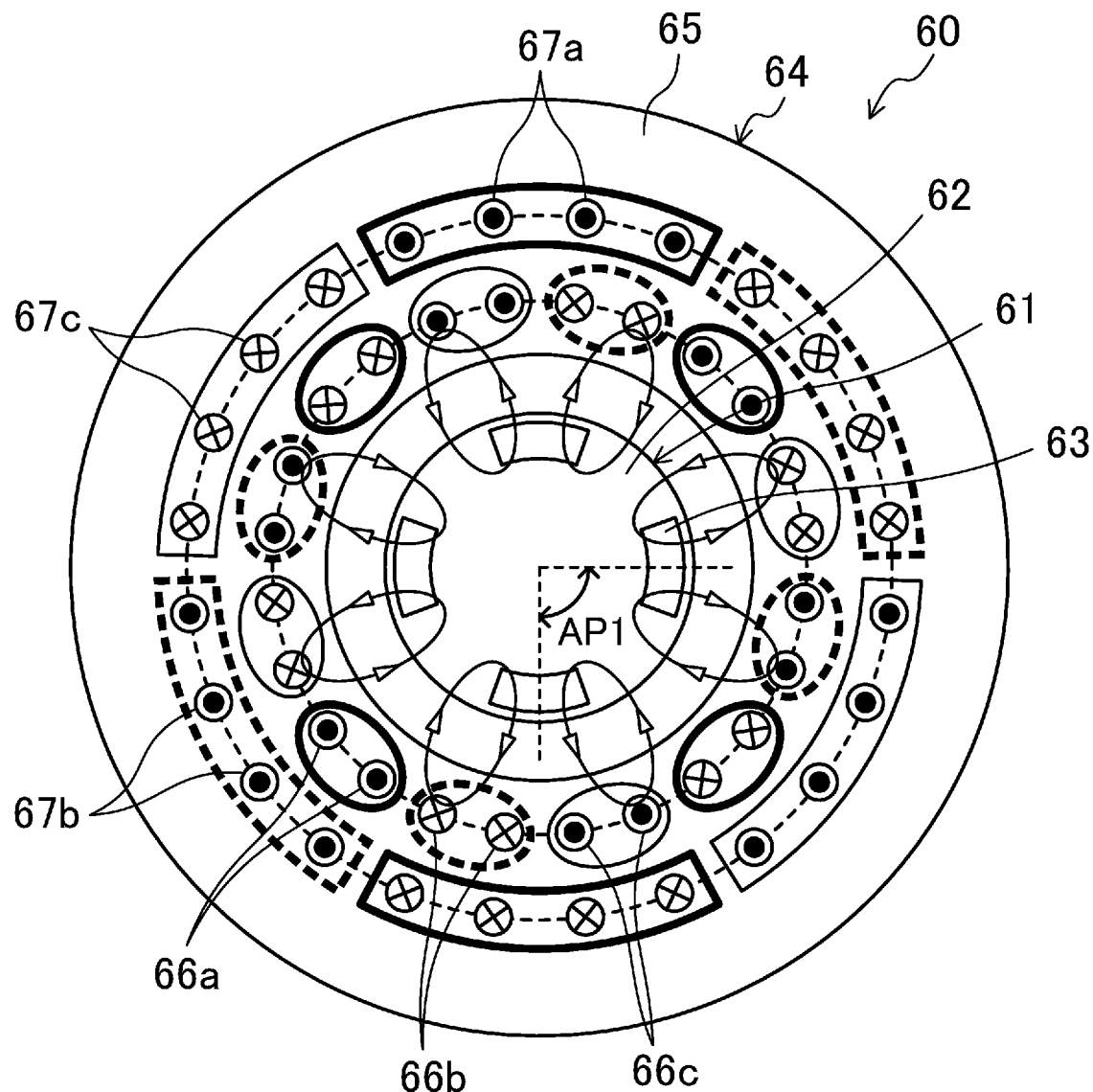
FIG. 2 is a diagram illustrating a transverse section of an example configuration of a first bearingless motor.

FIG. 2 is a diagram illustrating a transverse section of an example configuration of the first bearingless motor (60). As shown in FIG. 2, the first bearingless motor (60) is of a consequent-pole type. The stator (64) of the first bearingless motor (60) includes a back yoke (65), a plurality of toothed portions (not shown), driving coils (66a to 66c) and supporting coils (67a to 67c) which are wound around the toothed portions. The rotor (61) of the first bearingless motor (60) includes a core (62) and a plurality of (four in this example) permanent magnets (63) embedded in the core (62).

The stator (64) is made of a magnetic material (e.g., laminated steel sheets). The back yoke (65) of the stator (64) is in a cylindrical shape. The driving coils (66a to 66c) and the supporting coils (67a to 67c) are wound around each toothed portion in a distributed winding method. The driving coils (66a to 66c) and the supporting coils (67a to 67c) may be wound around each toothed portion in a concentrated winding method.

The driving coils (66a to 66c) are wound around the inner circumferential side of the toothed portions. The driving coils (66a to 66c) include a U-phase driving coil (66a) surrounded by a thick solid line in FIG. 2, a V-phase driving coil (66b) surrounded by a thick broken line, and a W-phase driving coil (66c) surrounded by a thin solid line. The number of windings of the driving coils (66a to 66c) of the first bearingless motor (60) is greater than the number of windings of the driving coils (76a to 76c) of the second bearingless motor (70) to be described later. Part of the driving magnetic flux generated by the driving coils (66a to 66c and 76a to 76c) contributes to generating a supporting force for supporting the radial load of the drive shaft (30)

(that is, the driving magnetic flux contributes to supporting the radial load). Thus, in a situation in which this relation of the number of windings is satisfied, the first bearingless motor (60) is likely to generate a larger radial supporting force than the second bearingless motor (70). The number of windings of the driving coils (66a to 66c) of the first bearingless motor (60) may be smaller than or equal to the number of windings of the driving coils (76a to 76c) of the second bearingless motor (70).

The supporting coils (67a to 67c) are wound around the outer circumferential side of the toothed portions. The supporting coils (67a to 67c) include a U-phase supporting coil (67a) surrounded by a thick solid line in FIG. 2, a V-phase supporting coil (67b) surrounded by a thick broken line, and a W-phase supporting coil (67c) surrounded by a thin solid line. The number of windings of the supporting coils (67a to 67c) of the first bearingless motor (60) is greater than the number of windings of the supporting coils (77a to 77c) of the second bearingless motor (70) to be described later. This configuration allows the first bearingless motor (60) to generate greater supporting magnetic flux for supporting the radial load of the drive shaft (30) (i.e., magnetic flux which contributes to supporting the radial load of the drive shaft (30)), compared to the second bearingless motor (70).

The product of the number of windings of the driving coils (66a to 66c) and the number of windings of the supporting coils (67a to 67c) in the first bearingless motor (60) is greater than the product of the number of windings of the driving coils (76a to 76c) and the supporting coils (77a to 77c) in the second bearingless motor (70). Thus, the first bearingless motor (60) has a greater maximum value of the supporting force for supporting the radial load of the drive shaft (30), compared to the second bearingless motor (70). As long as this relation of the products is satisfied, the number of windings of the supporting coils (67a to 67c) of the first bearingless motor (60) may be smaller than or equal to the number of windings of the supporting coils (77a to 77c) of the second bearingless motor (70).

The core (62) of the rotor (61) is in a cylindrical shape. The core (62) is provided with a shaft hole (not shown) for inserting the drive shaft (30) in a center portion of the core (62). The core (62) is made of a magnetic material (e.g., laminated steel sheets). Four permanent magnets (63) each having a shape along the outer circumferential surface of the core (62) are embedded in the vicinity of the outer circumferential surface of the core (62) at an angular pitch (AP1) of 90° in the circumferential direction of the rotor (61). The four permanent magnets (63) are identical in shape. The outer circumferential surface side of each permanent magnet (63) is an N pole, and the outer circumferential surface side of the core (62) between the permanent magnets (63) is a pseudo S pole. The outer circumferential surface side of each permanent magnet (63) may be an S pole.

Figure 3:
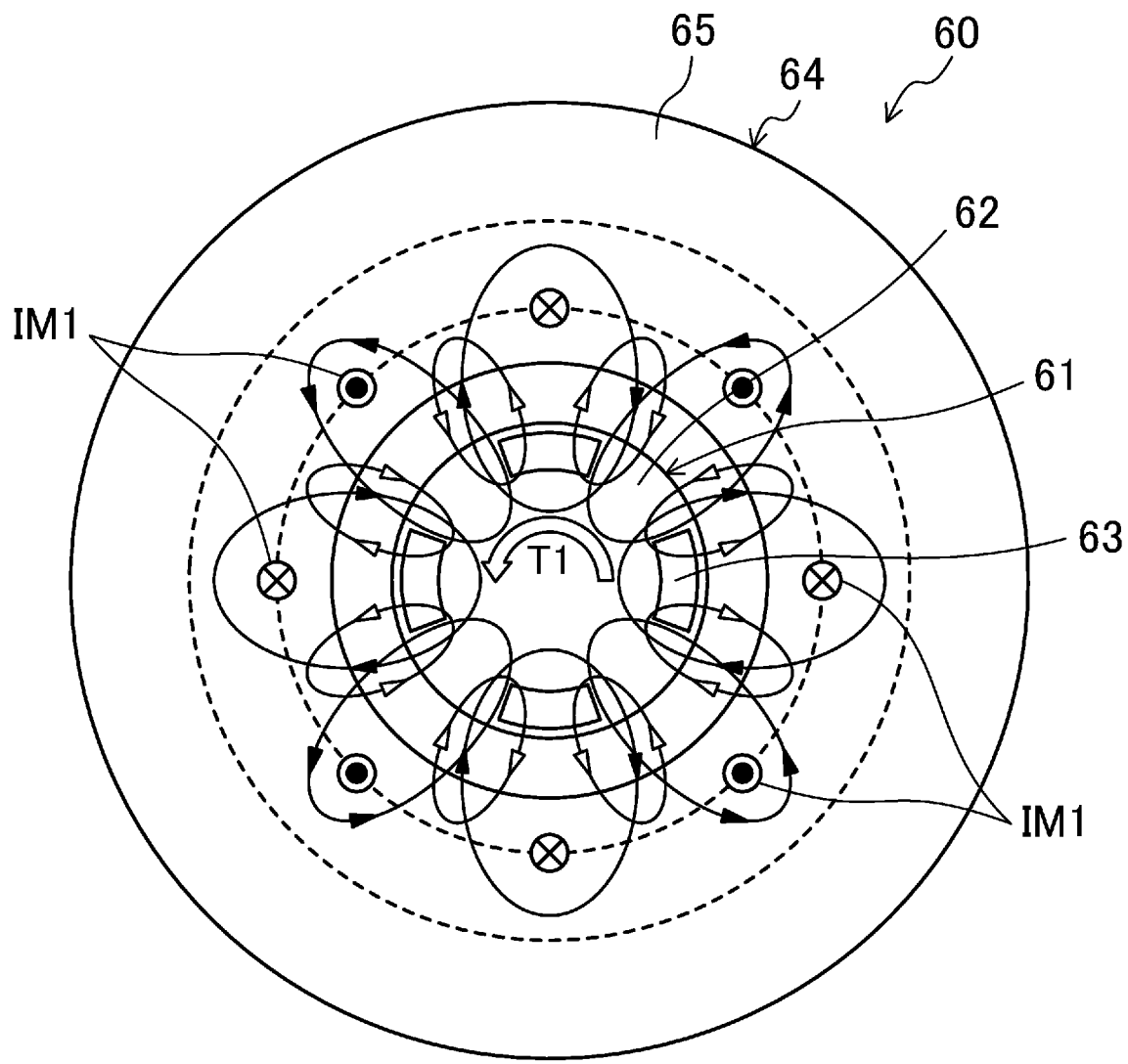
FIG. 3 is the transverse section of the first bearingless motor, showing magnetic flux of magnet and driving magnetic flux.
Figure 3:
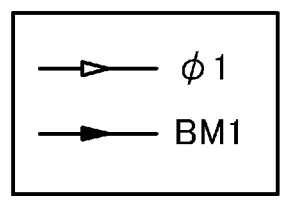

FIG. 3 illustrates magnetic flux φ1 of magnet generated by each permanent magnet (63) and driving magnetic flux BM1 generated to rotate the impeller (20) and the drive shaft (30) in the first bearingless motor (60). The first bearingless motor (60) is configured to generate a driving torque T1 in FIG. 3 (i.e., a torque for rotating the drive shaft (30) in the counterclockwise direction in FIG. 3) by the interaction between the magnetic flux φ1 of magnet and the driving magnetic flux BM1. In FIG. 3, a current IM1 equivalent to the current flowing through the driving coils (66a to 66c) is shown.

Figure 4:
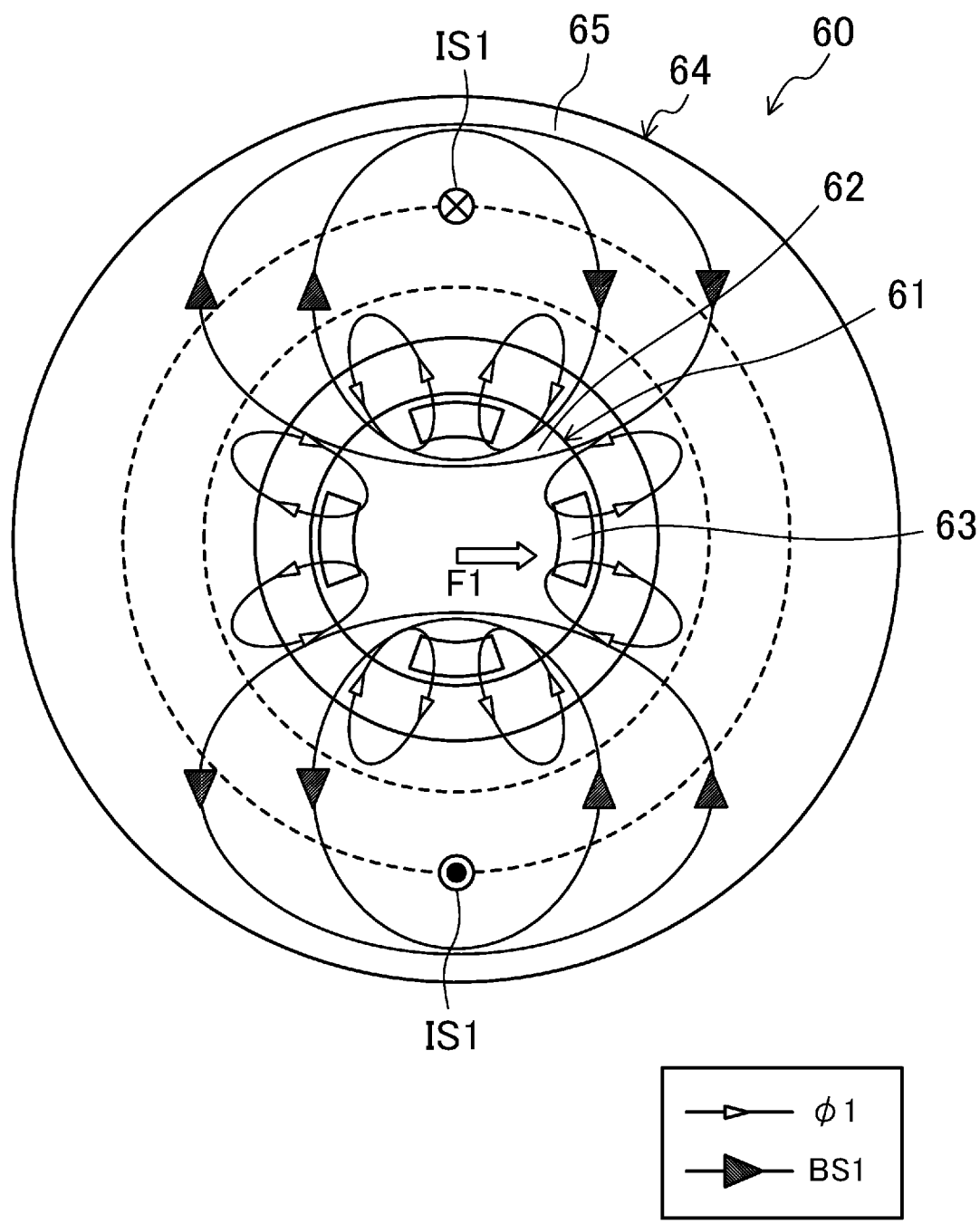
FIG. 4 is the transverse section of the first bearingless motor, showing the magnetic flux of the magnet and supporting magnetic flux.

FIG. 4 illustrates the magnetic flux φ1 of magnet generated by each permanent magnet (63) and supporting magnetic flux BS1 generated to support the radial load of the drive shaft (30) in a non-contact manner in the first bearingless motor (60). The first bearingless motor (60) is configured to generate a supporting force F1 in FIG. 4 (i.e., a force pushing the drive shaft (30) rightward in FIG. 4) by the interaction between the magnetic flux φ1 of magnet and the supporting magnetic flux BS1. In FIG. 4, a current IS equivalent to the current flowing through the supporting coils (67a to 67c) is shown.

As can be seen from FIG. 4, the magnetic path of the supporting magnetic flux BS1 which contributes to supporting the radial load of the drive shaft (30) passes through the back yoke (65) and toothed portions of the stator (64), the air gap, and the core (62) of the rotor (61). The magnetic resistance of each of the back yoke (65), the toothed portions, and the core (62) is smaller than the magnetic resistance of the permanent magnet (63). Thus, the first bearingless motor (60) has a lower magnetic resistance of the magnetic path for generating a supporting force for supporting the radial load of the drive shaft (30), than the second bearingless motor (70) provided with permanent magnets (73) around substantially the entire outer circumferential surface of the rotor (71) as will be described later (that is, the second bearingless motor (70) including a permanent magnet (73) in the magnetic path through which magnetic flux that contributes to supporting the radial load of the drive shaft (30) flows). This configuration allows the first bearingless motor (60) to generate a greater supporting force for supporting the radial load of the drive shaft (30), compared to the second bearingless motor (70). That is, the first bearingless motor (60) has a greater maximum value of the supporting force for supporting the radial load of the drive shaft (30), compared to the second bearingless motor (70).

Figure 5:
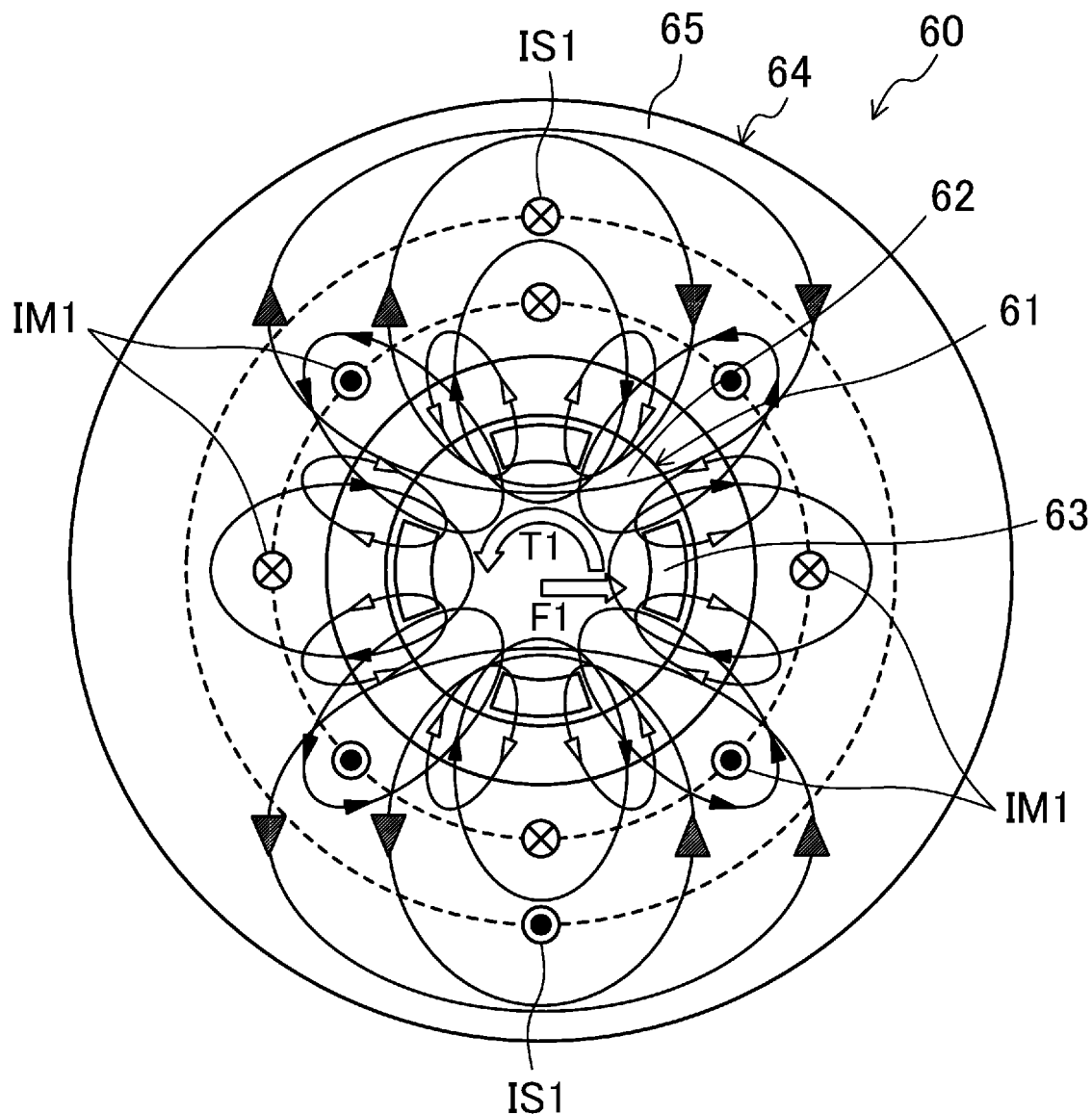
FIG. 5 is the transverse section of the first bearingless motor, showing the magnetic flux of the magnet, the driving magnetic flux, and the supporting magnetic flux.
Figure 5:
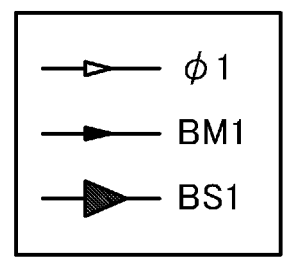

FIG. 5 illustrates the magnetic flux φ1 of magnet generated by each permanent magnet (63), driving magnetic flux BM1 generated to rotate the impeller (20) and the drive shaft (30), and supporting magnetic flux BS1 generated to support the radial load of the drive shaft (30) in a non-contact manner in the first bearingless motor (60). The first bearingless motor (60) is configured to simultaneously generate a driving torque T1 and a supporting force F1 in FIG. 5 by the interaction between the magnetic flux φ1 of magnet, the driving magnetic flux BM1, and the supporting magnetic flux BS1. In FIG. 5, a current IM1 and a current IS1 which are equivalent to the current flowing through the driving coils (66a to 66c) and the supporting coils (67a to 67c), respectively, are shown.

—Second Bearingless Motor—

The second bearingless motor (70) is disposed in the electric motor chamber (14) farther from the impeller (20). The second bearingless motor (70) is configured to rotate the drive shaft (30) and support the radial load of the drive shaft (30) in a non-contact manner by an electromagnetic force. The second bearingless motor (70) has a set of a rotor (71) and a stator (74). The rotor (71) is fixed to the drive shaft (30), and the stator (74) is fixed to the inner circumferential wall of the casing (10).

Figure 6:
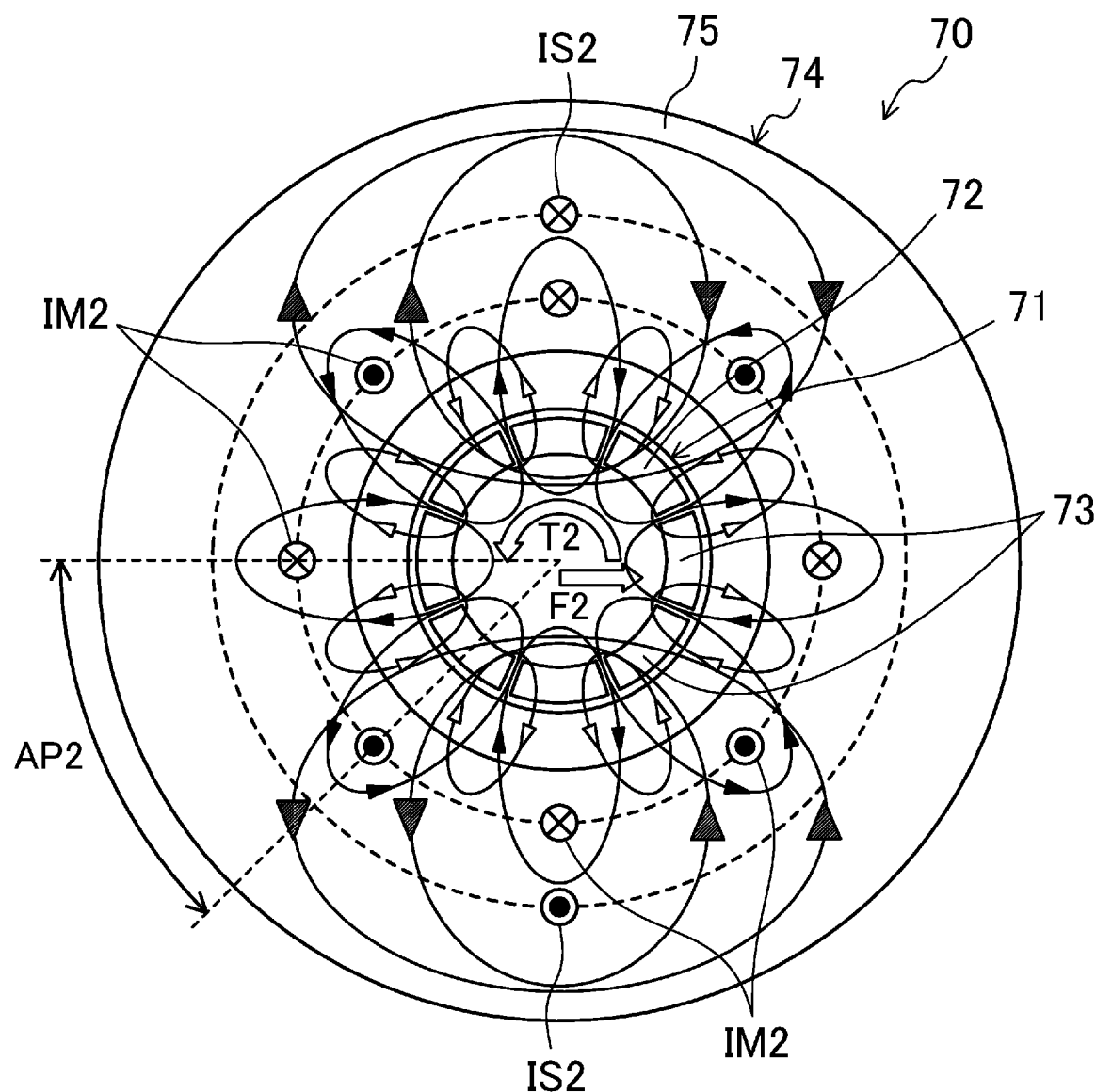
FIG. 6 is a diagram illustrating a transverse section of an example configuration of a second bearingless motor, showing magnetic flux of magnet, driving magnetic flux, and supporting magnetic flux.

FIG. 6 is a diagram illustrating a transverse section of an example configuration of the second bearingless motor (70). As shown in FIG. 6, the second bearingless motor (70) is of an embedded magnet type which exhibits substantially the same behavior as a surface magnet type bearingless motor.

The configuration of the stator (74) of the second bearingless motor (70) is the same as the configuration of the stator (64) of the first bearingless motor (60), except the number of windings of each of the coils (76a to 76c, 77a to 77c). The number of windings of the driving coils (76a to 76c) of the second bearingless motor (70) is greater than the number of windings of the driving coils (66a to 66c) of the first bearingless motor (60). This configuration allows the second bearingless motor (70) to generate greater driving magnetic flux for rotating the impeller (20) and the drive shaft (30), compared to the first bearingless motor (60). The number of windings of the supporting coils (77a to 77c) of the second bearingless motor (70) is smaller than the number of windings of the supporting coils (67a to 67c) of the first bearingless motor (60).

The rotor (71) of the second bearingless motor (70) includes a core (72) and a plurality of (eight in this example) permanent magnets (73) embedded in the core (72).

The core (72) of the rotor (71) is in a cylindrical shape. The core (72) is provided with a shaft hole (not shown) for inserting the drive shaft (30) in a center portion of the core (72). The core (72) is made of a magnetic material (e.g., laminated steel sheets). Eight permanent magnets (73) each having a shape along the outer circumferential surface of the core (72) are embedded in the vicinity of the outer circumferential surface of the core (72) at an angular pitch (AP2) of 45° in the circumferential direction of the rotor (71) (that is, at half the angular pitch (AP1) of 90° in the case of the first bearingless motor (60)). The eight permanent magnets (73) are identical in shape, and identical in shape with the four permanent magnets (63) of the first bearingless motor (60) as well. The outer circumferential surface side of the permanent magnets (73) exhibits N poles and S poles that appear alternately in the circumferential direction of the rotor (71).

FIG. 6 illustrates magnetic flux φ2 of magnet generated by each permanent magnet (73), driving magnetic flux BM2 generated to rotate the impeller (20) and the drive shaft (30), and supporting magnetic flux BS2 generated to support the radial load of the drive shaft (30) in a non-contact manner in the second bearingless motor (70). The second bearingless motor (70) is configured to simultaneously generate a driving torque T2 (i.e., a torque for rotating the drive shaft (30) in the counterclockwise direction in FIG. 6) and a supporting force F2 (i.e., a force pushing the drive shaft (30) rightward in FIG. 6), which are shown in FIG. 6, by the interaction between the magnetic flux φ2 of magnet, the driving magnetic flux BM2, and the supporting magnetic flux BS2.

As can be seen from FIG. 6, the magnetic path of the supporting magnetic flux BS2 passes through the back yoke (75) and toothed portions of the stator (74), the air gap, and the permanent magnets (73) and core (72) of the rotor (71).

The number of permanent magnets (73) in the second bearingless motor (70) is larger than the number of permanent magnets (63) in the first bearingless motor (60). Thus, the second bearingless motor (70) exhibits a higher density of magnetic flux generated by the permanent magnets (73), as compared to the first bearingless motor (60) (see FIG. 3). This configuration allows the second bearingless motor (70) to generate a greater driving torque for rotating the impeller (20) and the drive shaft (30), compared to the first bearingless motor (60).

<Method for Fabricating Rotor>

Now, a method of fabricating the rotors (61, 71) of the first and second bearingless motors (60, 70) of the present embodiment will be described. An example case will be described in which fifty core sheets (not shown) for each rotor (61, 71), that is, hundred core sheets in total, are required to fabricate the rotors (61, 71) of the bearingless motors (60, 70).

First, in a first step, a plurality of core sheets (hundred core sheets in this example) are formed by punching a steel sheet material using a predetermined die (not shown). The die used in the first step is capable of at least forming through holes corresponding to four permanent magnets (63) arranged at the angular pitch (AP1) of 90°. Preferably, the die used in the first step is capable of simultaneously forming the shaft hole in addition to the through holes.

Next, in a second step, some (fifty in this example) of the plurality of core sheets formed in the first step are laminated to one another to form the core (62) of the rotor (61) of the first bearingless motor (60).

Next, in a third step, the permanent magnets (63) are inserted in the through holes of the core (62) formed in the second step. The rotor (61) of the first bearingless motor (60) can be fabricated through these first to third steps.

Next, in a fourth step, another four through holes are formed in the rest (fifty in this example) of the plurality of core sheets formed in the first step by, for example, punching, so that each of the four through holes is positioned between adjacent ones of the four through holes formed in the first step. In the fourth step, the same die as used in the first step may be used again by rotating the die by 45° in the circumferential direction, or a die different from the die used in the first step may be used. A plurality of (fifty in this example) core sheets having eight through holes at the angular pitch (AP2) of 45° are formed in the fourth step.

Next, in a fifth step, the plurality of core sheets formed in the fourth step are laminated to one another to form the core (72) of the rotor (71) of the second bearingless motor (70).

Next, in a sixth step, the permanent magnets (73) are inserted in the through holes of the core (72) formed in the fifth step. The rotor (71) of the second bearingless motor (70) can be fabricated through these first and fourth to sixth steps.

In this manner, in the present embodiment, the same die can be used in at least the first step, in forming the core sheets of the rotor (61) of the first bearingless motor (60) and the core sheets of the rotor (71) of the second bearingless motor (70). This configuration can reduce the fabrication cost of the first and second bearingless motors (60, 70), and hence can reduce the fabrication cost of the turbo compressor (1).

The order of execution of the second to sixth steps may be appropriately changed as long as the rotors (61, 71) can be obtained. For example, the fourth step may be carried out before the second step.

—Advantages of Embodiment—

In the above embodiment, the radial load of the drive shaft (30) is supported by only the to bearingless motors (60, 70) in a non-contact manner. The two radial magnetic bearings used in the conventional turbo compressor can thus be omitted, which allows a reduction in size of the rotary system including the impeller (20) and the drive shaft (30).

In addition, the shorter the axial length of the rotary system including the impeller (20) and the drive shaft (30) is, the higher the resonance frequency of the rotary system becomes. In the present embodiment, the rotary system including the impeller (20) and the drive shaft (30) is reduced in size, which means that the axial length of the rotary system is shortened and the resonance frequency increases. It is therefore possible to extend the operation region where the turbo compressor (1) can be operated safely.

In the above embodiment, the first bearingless motor (60) is designed to be suitable for supporting a large radial load, and the second bearingless motor (70) is designed to be suitable for generating a large driving torque. That is, the first bearingless motor (60), which is capable of supporting a large radial load, is arranged at a portion of the drive shaft (30) closer to the impeller (20) where a relatively large radial load is generated. The second bearingless motor (70), which is not very suitable for supporting a radial load, but is capable of generating a large driving torque, is arranged at a portion of the drive shaft (30) farther from the impeller (20) where a relatively small radial load is generated.

In this manner, in the above embodiment, the first and second bearingless motors (60, 70) can be designed and arranged so as to be suitable for the load characteristics of the turbo compressor (1) in which the impeller (20) is attached to one end of the drive shaft (30). The rotary system including the impeller (20) and the drive shaft (30) can thus be further reduced in size.

In the above embodiment, the following three improvements are mainly made so that the first bearingless motor (60) be suitable for supporting the large radial load of the drive shaft (30) (i.e., so as to increase the maximum value of the supporting magnetic flux for generating an electromagnetic force that supports the radial load).

First, the magnetic resistance of the magnetic path in the first bearingless motor (60), through which magnetic path the supporting magnetic flux for supporting the radial load of the drive shaft (30) flows, is set to be smaller than the magnetic resistance of the magnetic path in the second bearingless motor (70). Second, the first power source (91) corresponding to the first bearingless motor (60) is configured to have a larger maximum value of the current for generating the driving magnetic flux and the supporting magnetic flux, than the second power source (92) corresponding to the second bearingless motor (70). Third, the number of windings of the driving coils (66a to 66c) and the number of windings of the supporting coils (67a to 67c) in the first bearingless motor (60) are set to be greater than the number of windings of the driving coils (76a to 76c) and the number of windings of the supporting coils (77a to 77c) in the second bearingless motor (70), respectively. These improvements can be applied alone or in any combination.

In the above embodiment, all permanent magnets (63) of the first bearingless motor (60) and all permanent magnets (73) of the second bearingless motor (70) are identical in shape. This configuration, in which it is not necessary to form permanent magnets in different shapes, can reduce the cost of the first and second bearingless motors (60, 70), and hence can reduce the cost of the turbo compressor (1).

In the above embodiment, in addition to the identical shape of all the permanent magnets (63, 73), the number of permanent magnets (73) (specifically eight permanent magnets) included in the second bearingless motor (70) is tice the number of all the permanent magnets (63) (specifically four permanent magnets) included in the first bearingless motor (60). Further, the angular pitch (AP2) (specifically, 45°) between adjacent ones of the permanent magnets (73) in the circumferential direction of the rotor (71) in the second bearingless motor (70) is half the angular pitch (specifically, 90°) in the first bearingless motor (60). This configuration allows using the same die as at least some of the dies used to fabricate the rotors (61, 71) of the first and second bearingless motors (60, 70), as described in the "Method for Fabricating Rotor," thereby making it possible to reduce the cost of the first and second bearingless motors (60, 70) and hence reduce the cost of the turbo compressor (1).

Other Embodiments

In the above embodiment, the electric motor type of the first bearingless motor (60) (specifically the consequent-pole type) and the electric motor type of the second bearingless motor (70) (specifically the embedded magnet type) are different from each other. However, the bearingless motors (60, 70) may be of the same electric motor type. In such a case, the magnetic permeability of the magnetic material used for the stator (64, 74) and the rotor (61, 71) needs to be higher in the first bearingless motor (60) than in the second bearingless motor (70). This configuration allows the first bearingless motor (60) to have a smaller magnetic resistance of the magnetic path for generating the supporting force for supporting the radial load of the drive shaft (30) (i.e., the magnetic resistance of the magnetic path in which the driving magnetic flux and the supporting magnetic flux that contribute to supporting the radial load of the drive shaft (30)), compared to the second bearingless motor (70).

In the above embodiment, the turbo compressor (1) has two bearingless motors (60, 70), but max have three or more bearingless motors.

In the above embodiment, the first bearingless motor (60) is of a consequent-pole type, but the type of the first bearingless motor (60) is not limited thereto. The second bearingless motor (70) is not limited to the type described in the above embodiment, neither.

In the above embodiment, the bearingless motor (60, 70) includes the driving coils (66a to 66c, 76a to 76c) and the supporting coils (67a to 67c, 77a to 77c), but may include a common coil having the functions of both coils (66a to 66c, 67a to 67c, 76a to 76c, 77a to 77c).

In the above embodiment, the number of the permanent magnets differs between the permanent magnets (63, 73) to cause a difference between the magnetic flux (pi generated by the permanent magnets (63) of the first bearingless motor (60) and the magnetic flux φ2 generated by the permanent magnets (73) of the second bearingless motor (70). However, for example, at least one of the size or the remanent magnetic flux density of each permanent magnet (63) of the first bearingless motor (60) may be differentiated from those of each permanent magnet (73) of the second bearingless motor (70) to cause a difference between the magnetic flux 9*l* generated by the permanent magnets (63) of the first bearingless motor (60) and the magnetic flux T2 generated by the permanent magnets (73) of the second bearingless motor (70).

In the above embodiment, all permanent magnets (63) of the first bearingless motor (60) and all permanent magnets (73) of the second bearingless motor (70) are identical in shape, but the shape of the permanent magnets (63, 73) may be different from each other.

In the above embodiment, the rotor (61, 71) and the stator (64, 74) are made of laminated steel sheets, but may be made of a material other than the laminated steel sheets.

In the above embodiment, the turbo compressor (1) has only one impeller (20), but may have two or more impellers (20). For example, one impeller (20) may be attached to each end of the drive shaft (30).

In the above embodiment, the turbo compressor (1) having the electric motor system (2) has been described, but the use of the electric motor system (2) is not limited to the use in the turbo compressor (1).

INDUSTRIAL APPLICABILITY

As can be seen from the foregoing description, the present invention is useful as an electric motor system and a turbo compressor having the electric motor system.

DESCRIPTION OF REFERENCE CHARACTERS

1 Turbo Compressor
2 Electric Motor System

20 Impeller (Load)
30 Drive Shaft
60 First Bearingless Motor
61 Rotor
63 Permanent Magnet
64 Stator
67a to 67c Supporting Coil (Coil)
70 Second Bearingless Motor
71 Rotor
73 Permanent Magnet
74 Stator
77a to 77c Supporting Coil (Coil)
91 First Power Source (Electric Circuit)
92 Second Power Source (Electric Circuit)
AP1 Angular Pitch
AP2 Angular Pitch

The invention claimed is:

1. An electric motor system, comprising:
a drive shaft which rotates a load; and
a plurality of bearingless motors arranged next to each other in an axial direction of the drive shaft, and each having a set of a rotor and a stator to rotate the drive shaft and support a radial load of the drive shaft in a non-contact manner by an electromagnetic force, wherein
the electric motor system is configured such that the radial load of the drive shaft is supported by only the plurality of bearingless motors,
maximum values of the radial load acting on the plurality of bearingless motors are not uniform, and
the bearingless motor, the maximum value of the radial load acting on which is the largest, has a greater maximum value of a supporting force for supporting the radial load, compared with the bearingless motor, the maximum value of the radial load acting on which is the smallest,
the electric motor system further comprising:
electric circuits which are provided so as to respectively correspond to the plurality of bearingless motors, and through which a current for generating, in the bearingless motors, magnetic flux that contributes to supporting the radial load flows, wherein
the electric circuit corresponding to the bearingless motor, the maximum value of the radial load acting on which is the largest, has a greater maximum value of the current for generating the magnetic flux that contributes to supporting the radial load, compared with the electric circuit corresponding to the bearingless motor, the maximum value of the radial load acting on which is the smallest.

2. The system of claim 1, wherein
the bearingless motor, the maximum value of the radial load acting on which is the largest, has a greater maximum value of supporting magnetic flux generated to generate an electromagnetic force for supporting the radial load, compared with the bearingless motor, the maximum value of the radial load acting on which is the smallest.

3. The system of claim 1, wherein
the bearingless motor, the maximum value of the radial load acting on which is the largest, has a smaller magnetic resistance of a magnetic path for generating the supporting force for supporting the radial load, compared with the bearingless motor, the maximum value of the radial load acting on which is the smallest.

4. A turbo compressor comprising:
the electric motor system of claim 1; and
an impeller, wherein
the impeller is the load rotated by the drive shaft.

5. The turbo compressor of claim 4, wherein
the impeller is arranged at only one end of the drive shaft, and
among the plurality of bearingless motors, the bearingless motor, the maximum value of the radial load acting on which is the largest, is nearest to the impeller.

6. An electric motor system, comprising:
a drive shaft which rotates a load; and
a plurality of bearingless motors arranged next to each other in an axial direction of the drive shaft, and each having a set of a rotor and a stator to rotate the drive shaft and support a radial load of the drive shaft in a non-contact manner by an electromagnetic force, wherein
the electric motor system is configured such that the radial load of the drive shaft is supported by only the plurality of bearingless motors,
maximum values of the radial load acting on the plurality of bearingless motors are not uniform,
the bearingless motor, the maximum value of the radial load acting on which is the largest, has a greater maximum value of a supporting force for supporting the radial load, compared with the bearingless motor, the maximum value of the radial load acting on which is the smallest,
the stators of the respective bearingless motors include coils for generating the magnetic flux that contributes to supporting the radial load, and
the bearingless motor, the maximum value of the radial load acting on which is the largest, has a greater number of windings of the coils, compared with the bearingless motor, the maximum value of the radial load acting on which is the smallest.

7. The system of claim 6, wherein
the bearingless motor, the maximum value of the radial load acting on which is the largest, has a greater maximum value of supporting magnetic flux generated to generate an electromagnetic force for supporting the radial load, compared with the bearingless motor, the maximum value of the radial load acting on which is the smallest.

8. The system of claim 6, wherein
the bearingless motor, the maximum value of the radial load acting on which is the largest, has a smaller magnetic resistance of a magnetic path for generating the supporting force for supporting the radial load, compared with the bearingless motor, the maximum value of the radial load acting on which is the smallest.

9. A turbo compressor comprising:
the electric motor system of claim 6; and
an impeller, wherein
the impeller is the load rotated by the drive shaft.

10. The turbo compressor of claim 9, wherein
the impeller is arranged at only one end of the drive shaft, and
among the plurality of bearingless motors, the bearingless motor, the maximum value of the radial load acting on which is the largest, is nearest to the impeller.

11. An electric motor system, comprising:
a drive shaft which rotates a load; and
a plurality of bearingless motors arranged next to each other in an axial direction of the drive shaft, and each having a set of a rotor and a stator to rotate the drive shaft and support a radial load of the drive shaft in a non-contact manner by an electromagnetic force, wherein the electric motor system is configured such that the radial load of the drive shaft is supported by only the plurality of bearingless motors, maximum values of the radial load acting on the plurality of bearingless motors are not uniform, the bearingless motor, the maximum value of the radial load acting on which is the largest, has a greater maximum value of a supporting force for supporting the radial load, compared with the bearingless motor, the maximum value of the radial load acting on which is the smallest, each of the rotors of the respective bearingless motors includes a plurality of permanent magnets, and the bearingless motor, the maximum value of the radial load acting on which is the smallest, has a greater number of the permanent magnets included in the rotor, compared with the bearingless motor, the maximum value of the radial load acting on which is the largest.

12. The system of claim 11, wherein all of the permanent magnets of the bearingless motor, the maximum value of the radial load acting on which is the smallest, and all of the permanent magnets of the bearingless motor, the maximum value of the radial load acting on which is the largest, are identical in shape.

13. The system of claim 12, wherein the number of the permanent magnets of the bearingless motor, the maximum value of the radial load acting on which is the smallest, is twice the number of the permanent magnets of the bearingless motor, the maximum of the radial load acting on which is the largest, and an angular pitch between adjacent ones of the permanent magnets of the rotor of the bearingless motor in a circumferential direction, the maximum value of the radial load acting on which bearingless motor is the smallest, is half an angular pitch between adjacent ones of the permanent magnets of the rotor of the bearingless motor in the circumferential direction, the maximum of the radial load acting on which bearingless motor is the largest.

14. The system of claim 11, wherein the bearingless motor, the maximum value of the radial load acting on which is the largest, has a greater maximum value of supporting magnetic flux generated to generate an electromagnetic force for supporting the radial load, compared with the bearingless motor, the maximum value of the radial load acting on which is the smallest.

15. The system of claim 11, wherein the bearingless motor, the maximum value of the radial load acting on which is the largest, has a smaller magnetic resistance of a magnetic path for generating the supporting force for supporting the radial load, compared with the bearingless motor, the maximum value of the radial load acting on which is the smallest.

16. A turbo compressor comprising:

the electric motor system of claim 11; and an impeller, wherein the impeller is the load rotated by the drive shaft.

17. The turbo compressor of claim 16, wherein the impeller is arranged at only one end of the drive shaft, and among the plurality of bearingless motors, the bearingless motor, the maximum value of the radial load acting on which is the largest, is nearest to the impeller.

* * * * *